United States Patent [19]

Cook

[11] Patent Number: 5,170,284
[45] Date of Patent: Dec. 8, 1992

[54] WIDE FIELD OF VIEW FOCAL THREE-MIRROR ANASTIGMAT

[75] Inventor: Lacy G. Cook, El Segundo, Calif.

[73] Assignee: Hughes Aircraft Company, Los Angeles, Calif.

[21] Appl. No.: 745,674

[22] Filed: Aug. 16, 1991

[51] Int. Cl.$^5$ .................. G02B 17/06; G02B 5/10
[52] U.S. Cl. ..................... 359/365; 359/366; 359/861
[58] Field of Search ............. 350/504, 505, 618, 619, 350/620, 622; 359/365, 366, 858, 859, 861

[56] References Cited

U.S. PATENT DOCUMENTS

| | | |
|---|---|---|
| 2,970,518 | 2/1961 | Ross ........................ 350/620 |
| 3,631,248 | 12/1971 | Johnson . |
| 4,101,195 | 7/1978 | Korsch . |
| 4,240,707 | 12/1980 | Wetherell et al. . |
| 4,265,510 | 5/1981 | Cook . |
| 4,598,981 | 7/1986 | Hallam et al. ............. 350/505 |
| 4,733,955 | 3/1988 | Cook . |
| 4,812,030 | 3/1989 | Pinson . |
| 4,834,517 | 5/1989 | Cook . |

Primary Examiner—Bruce Y. Arnold
Assistant Examiner—R. D. Shafer
Attorney, Agent, or Firm—Georgann S. Grunebach; William J. Streeter; Wanda K. Denson-Low

[57] ABSTRACT

An all-reflective optical three-mirror system has a negative power primary (12), positive power secondary (14), and positive power tertiary (16) mirror which form a focal reimaging optical system. The system is capable of imaging very wide fields of view and may be utilized in pilotage, navigation, driving or the like operations while providing substantially complete detector cold shielding.

4 Claims, 2 Drawing Sheets

WIDE FIELD OF VIEW FOCAL THREE-MIRROR ANASTIGMAT

BACKGROUND OF THE INVENTION

1. Technical Field

This invention relates to a wide field of view optical system and, more particularly, to an all-reflective focal or image forming three-mirror anastigmat optical system.

2. Discussion

Wide field of view optical systems, such as reflective telescopes are utilized in multiple spectral applications and in certain space sensor systems. For applications in which navigation, pilotage, or driving of a vehicle are involved, the optical system must provide a large two-dimensional field of view such as 20×30, 20×40, or 30×40 degrees. It is believed that in future pilotage, navigation, and driving sensors that scanned linear detector arrays will be replaced by full two-dimensional staring arrays. The optical and mechanical simplification in the evolution of staring arrays is apparent. Existing platinum-silicide staring arrays are believed to be but a temporary step in the evolution process. It is believed that future staring arrays will be higher quantum efficiency mercury-cadmium-telluride staring arrays.

Current existing all-reflective optical systems are generally of two types. One type is the relayed design which provides needed cold shielding, however, the shielding is only provided for high aspect ratio line fields of view. Another type of system is a nonrelayed design which provides needed wide two-dimensional fields of view, however, these systems do not provide the required cold shielding.

Existing all-reflective relayed focal telescopes which provide detector cold shielding are illustrated by U.S. Pat. Nos. 4,101,195 issued Jul. 18, 1978 to Korsch, entitled "Anastigmatic Three-Mirror Telescope"; 4,265,510 issued May 5, 1981 to Cook, entitled "Three-Mirror Anastigmatic Optical System"; and 4,834,517 issued May 30, 1989 to Cook, entitled "Method and Apparatus for Receiving Optical Signals", both of the Cook patents are assigned to the same assignee of the present invention, all of the specifications of which are expressly incorporated by reference. While these patents provide desired detector cold shielding, they are limited to two-dimensional fields of view significantly below that needed in pilotage, navigation, or driving operations. Generally, these patents provide high aspect ratio line fields of view which are utilized with current scanning sensors.

The art also illustrates all-reflective, non-relayed, focal three-mirror telescopes which provide generally larger fields of view than the above cited references and in some cases the fields of view are sufficient for pilotage, navigation, or driving. Such patents are illustrated by U.S. Pat. Nos. 4,240,707 issued Dec. 23, 1980 to Wetherell et al., entitled "All-reflective Three Element Objective"; and 4,733,955 issued Mar. 29, 1988 to Cook, entitled "Reflective Optical Triplet Having a Real Entrance Pupil", which is assigned to the assignee of the present invention, both specifications of which are herein expressly incorporated by reference. While these patents illustrate applications with wide fields of view, these non-relayed designs fail to provide the needed detector cold shielding.

Also, various types of refractive systems have been utilized which provide large field of view capabilities, however, these refractive systems have several disadvantages. Some limitations of refractive telescopes are chromatic aberrations, spectral limitations (e.g., visible TV system cannot share the same telescope as the LWIR FLIR), defocus with temperature change requiring compensation, potentially high narcissus, and high cost associated with the complexity and expensive refractive materials.

SUMMARY OF THE INVENTION

According to the teachings of the present invention, a system is provided which retains the versatility and benefits of reflective optics while eliminating the disadvantages of refractive optical systems. The present invention provides an all-reflective focal or image forming three-mirror anastigmat which provides very wide field of view capabilities. The very wide field of view enables the invention to be utilized in pilotage, navigation, or driving operations. The present invention also enables multi-spectral operations such as combining visible TV or MWIR with the basic LWIR FLIR.

The present invention provides the art with an all-reflective focal telescope which exhibits substantially unobscured aperture and field capabilities. The present invention is relatively simple, low cost, has broad spectral coverage, high transmission and is substantially narcissus free. The present invention provides an all-reflective optical system with wide fields of view which have previously only been achieved by the use of refractive optical systems. Also, the present invention provides substantially complete or 100 percent cold shielding for the detector array.

In the preferred embodiment, the all-reflective wide field of view optical system includes a primary, secondary, and tertiary mirror. The primary, secondary and tertiary mirrors are positioned to receive and reflect energy from the object being viewed to a plane for viewing. The primary, secondary, and tertiary mirrors have surfaces shaped to reflect through an exit pupil. Thus, the system provides a large area field of view enabling pilotage, navigation, driving or the like and provides substantially complete cold shielding for a detector array.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
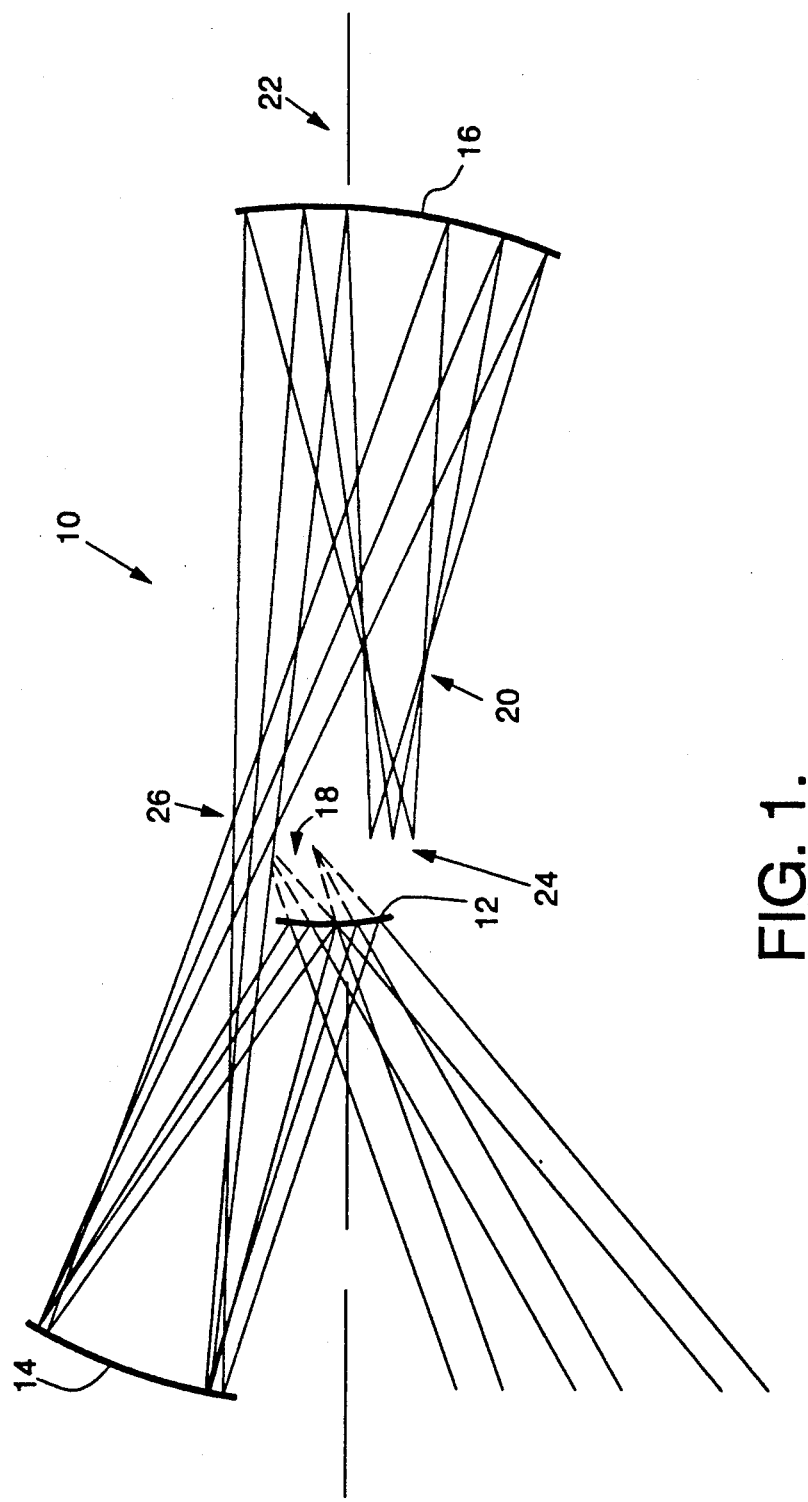
FIG. 1 is a schematic view of an elevation view of an apparatus in accordance with the teachings of the present invention.
Figure 2:
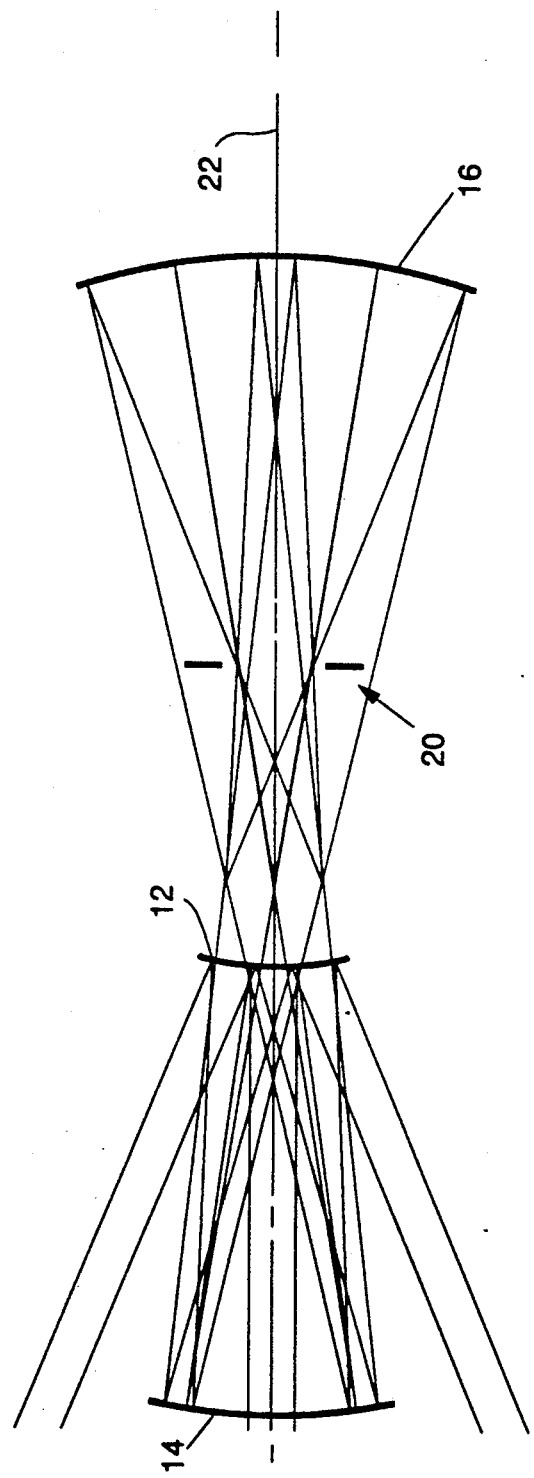
FIG. 2 is a schematic diagram of an azimuth view of the apparatus of FIG. 1.

Referring to FIGS. 1 and 2, a three-mirror focal optical system is illustrated and designated with the reference numeral 10. The system is a relayed, focal or image forming optical system including three powered mirrors. The system 10 includes a primary mirror 12, secondary mirror 14, and tertiary mirror 16. Also, the system includes a virtual entrance aperture 18, an intermediate image 26, a real exit pupil 20, and final image surface 24.

The primary mirror 12 includes a central axis which defines the system optical axis 22. The primary mirror 12 is a negative power mirror and may be a conic or higher order aspheric mirror.

The secondary mirror 14 is a positive power mirror and is positioned such that it is in a reverse Cassegrain-like configuration with the primary mirror 12. The secondary mirror is positioned substantially on-axis with respect to the optical axis 22. The secondary mirror 14 may be a conic or higher order aspheric mirror.

The tertiary mirror 16 is a positive power mirror. The tertiary mirror is positioned substantially on-axis with respect to the optical axis 22 of the system. The tertiary mirror 16 may be a conic or higher order aspheric mirror.

The primary and secondary mirrors act as an objective part of the telescope to form an intermediate image 26. The tertiary mirror 16 acts as the relay part of the telescope and reimages the energy from the intermediate image 26 to the final image at a plane 24 for viewing. Thus, as energy is reflected from the object being viewed to the primary mirror 12 and secondary mirror 14, an intermediate image 26 is formed prior to the energy reflecting to the tertiary mirror 16 where the energy is reimaged and ultimately reflected through exit pupil 20 and then to a final image plane 24 for viewing.

The entrance pupil 18 and the exit pupil 20 are offset from the optical axis 22. The field of view is also offset from the optical axis 22.

The primary 12, secondary 14, and tertiary 16 mirrors form a relayed focal three-mirror anastigmat telescope capable of imaging wide fields of view. The system is capable of wide fields of view of at least 20×30 degrees. Also, the system provides substantially 100 percent detector cold shielding.

Generally, the mirrors are machined using precision diamond turning techniques which provide for high optical transmission. Also, the precision machining enables fewer total parts and the use of relatively inexpensive materials when compared to refractive elements.

A specific prescription for the system in accordance with the present invention as illustrated in FIGS. 1 and 2 is as follows:

TABLE 1

OPTICAL PRESCRIPTION OF A SPECIFIC EMBODIMENT OF THE OPTICAL SYSTEM OF THE PRESENT INVENTION

| | Description | Radius | CC | FOCAL | AD | AE | AF |
|---|---|---|---|---|---|---|---|
| (18) | Entrance Pupil | ∞ | — | | — | — | — |
| (12) | Primary Mirror | 2.3044 | 11.372 | | $-0.3250 \times 10^{-1}$ | $-0.2651 \times 10^{-1}$ | $-0.4282$ |
| (14) | Secondary Mirror | 4.3470 | $-0.03239$ | | $0.1665 \times 10^{-4}$ | $0.3841 \times 10^{-5}$ | $-0.3507 \times 10^{-6}$ |
| (16) | Tertiary Mirror | $-4.1599$ | 0.2297 | | $0.5326 \times 10^{-4}$ | $-0.2449 \times 10^{-4}$ | $0.4081 \times 10^{-5}$ |
| (20) | Exit Pupil | ∞ | — | | — | — | — |
| (24) | Focal Plane | ∞ | — | | — | — | — |

Focal Length: 1.00
Entrance Pupil Diameter: 0.25
F-Number: F/4.0
Entrance Pupil Offset: 0.25 (to pupil center)
Field of View: 20° × 40° rectangular
Field of View Offset: 25° (to FOV center)
Surface Sag Equation $$Z = \frac{C\rho^2}{1 + \sqrt{1 - (K+1)C^2\rho^2}} + AD\rho^4 + AE\rho^6 + AF\rho^8$$

C = 1/Radius
K = Conic Constant $\rho = \sqrt{X^2 + Y^2}$ (+) Distance are to the right along primary mirror optical axis
(+) Radii have centers to the right
(+) Decenters are up
(+) Tilts are counterclockwise, degrees
CC Conic Constant = (Eccentricity)$^2$
Decenters are done before tilting
Thicknesses are between mirror vertices before decenters and tilts are applied
All dimensions are in inches unless specified otherwise The above design has a 20×40 degree field of view and a 0.25 inch aperture in object space. The optical speed is generally between F/2 to F/6 and in the above example is F/4. The entrance pupil is reimaged at the exit pupil/aperture stop with a magnification of about 0.5. Other embodiments of the invention may accommodate up to 30 degrees field of view in the elevation plane and fields exceeding 40 degrees in the azimuth plane.

The present invention has several advantages over conventional three-mirror anastigmatic optical systems. The present invention uses an all-reflective system to provide wide fields of view with substantially 100 percent detector cold shielding. The present invention has field of view capabilities like those currently only available with refractive optical systems, but has the advantages of reflective optical systems. The present invention provides a system for field intensive sensing missions (e.g., pilotage, navigation, driving or the like) while offering the advantages of reflective optical systems.

It should be understood that while this invention has been described in connection with the particular examples hereof, that various modifications, alterations and variations of the disclosed preferred embodiment can be made after having the benefit of the study of the specification, drawings and the subjoined claims.

What is claimed is:

1. A relayed image forming three-mirror optical system comprising:
    a negative power primary mirror defining an optical axis;

a secondary mirror facing said primary mirror such that energy from a viewed object is reflected by said secondary mirror;

an intermediate image formed by said primary and secondary mirrors;

a tertiary mirror positioned to receive energy from said secondary mirror and to focus the energy to a plane for viewing;

said primary, secondary and tertiary mirrors having surfaces shaped to reflect through a real exit pupil located between said tertiary mirror and said viewing plane, wherein said mirrors have general aspheric surfaces providing the system with a very large field of view wherein said field of view is from about at least about 20×30 degrees to 30×40 degrees suitable for pilotage, navigation or driving and said system providing substantially complete detector cold shielding.

2. A relayed image forming three-mirror optical system comprising;

a negative power primary mirror defining an optical axis;

a secondary mirror facing said primary mirror such that energy from a viewed object is reflected by said secondary mirror;

an intermediate image formed by said primary and secondary mirrors;

a tertiary mirror positioned to receive energy from said secondary mirror and to focus the energy to a plane for viewing;

said primary, secondary and tertiary mirrors having surfaces shaped to reflect through a real exit pupil located between said tertiary mirror and said viewing plane, wherein said mirrors have conic surfaces providing the system with a very large field of view wherein said field of view is from about at least about 20×30 degrees to 30×40 degrees suitable for pilotage, navigation or driving and said system providing substantially complete detector cold shielding.

3. A relayed image forming three-mirror optical system comprising;

a primary mirror defining an optical axis, said primary mirror having negative power;

a secondary mirror facing said primary mirror such that energy from a viewed object is reflected by said secondary mirror, said secondary mirror having positive power;

an intermediate image of said object being viewed, formed by said primary and secondary mirrors;

a tertiary mirror positioned to receive energy from said secondary mirror and to focus the energy to a plane for viewing, said tertiary mirror having positive power;

said primary, secondary and tertiary mirrors having surfaces shaped to reflect through a real exit pupil located between said tertiary mirror wherein said primary, secondary and tertiary mirrors have conic surfaces and said viewing plane providing the system with a very large field of view suitable for pilotage, navigation or driving an said system providing substantially complete detector cold shielding.

4. A relayed image forming three-mirror optical system comprising;

a primary mirror defining an optical axis, said primary mirror having negative power;

a secondary mirror facing said primary mirror such that energy from a viewed object is reflected by said secondary mirror, said secondary mirror having positive power;

an intermediate image of said object being viewed, formed by said primary and secondary mirrors;

a tertiary mirror positioned to receive energy from said secondary mirror and to focus the energy to a plane for viewing, said tertiary mirror having positive power;

said primary, secondary and tertiary mirrors having surfaces shaped to reflect through a real exit pupil located between said tertiary mirror wherein said primary, secondary and tertiary mirrors have general aspheric surfaces and said viewing plane providing the system with a very large field of view suitable for pilotage, navigation or driving an said system providing substantially complete detector cold shielding.

* * * * *